March 10, 1964 D. T. THOMPSON Re. 25,536

APPARATUS FOR MAKING AN ANNULUS

Original Filed Sept. 21, 1959 4 Sheets-Sheet 1

INVENTOR.
DANIEL T. THOMPSON
BY
Miketta and Glenny
ATTORNEYS.

APPARATUS FOR MAKING AN ANNULUS

Original Filed Sept. 21, 1959 4 Sheets-Sheet 2

INVENTOR.
DANIEL T. THOMPSON
BY
Miketta and Glenny
ATTORNEYS.

APPARATUS FOR MAKING AN ANNULUS

Original Filed Sept. 21, 1959 4 Sheets-Sheet 3

INVENTOR.
DANIEL T. THOMPSON
BY
Miketta and Glenny
ATTORNEYS.

APPARATUS FOR MAKING AN ANNULUS

Original Filed Sept. 21, 1959 4 Sheets-Sheet 4

INVENTOR.
DANIEL T. THOMPSON
BY
Miketta and Glenny
ATTORNEYS.

United States Patent Office

Re. 25,536
Reissued Mar. 10, 1964

25,536

APPARATUS FOR MAKING AN ANNULUS

Daniel T. Thompson, 10584 Bradbury Road, Los Angeles, Calif.

Original No. 3,031,979, dated May 1, 1962, Ser. No. 841,153, Sept. 21, 1959. Application for reissue Apr. 29, 1963, Ser. No. 276,680
13 Claims. (Cl. 107—8)

Matter enclosed in heavy brackets [ ] appears in the original patent but forms no part of this reissue specification; matter printed in italics indicates the additions made by reissue.

This invention relates to an apparatus for forming a ball-like batch of plastic, deformable, pliant composition such as dough, into the shape of an annulus.

A certain product, known as bagel and shaped like an annulus, is required to be formed from a very heavy, tough, elastic dough. The finished bagel should be seamless and should be uniform in thickness. In forming the annulus of dough before baking, the dough cannot be kneaded or worked excessively or it will not rise during the baking operation. In almost every instance, the annulus of dough is formed by hand in order to meet these requirements. Generally, the dough is rolled into a cylindrical strip and turned about the fingers of the baker to from an annulus with its ends overlapping. The overlapped ends are hand-rolled into integral relation forming the annulus. This manner of manually forming the bagel dough into an annulus is not only slow and inefficient, but the annulus has a nonuniform thickness and there is generally a seam visible where the ends are joined.

Heretofore, there were no machines or apparatus for satisfactorily and efficiently forming bagel dough into an annulus. A doughnut machine could not handle the tough, elastic dough required for bagels. In other apparatus capable of forming an annulus of bagel dough, the process was slow and complicated. In these apparatus, the dough for each bagel was required to be carefully precut by hand into a cylindrical strip before being fed into the machine. This required an extra manual step and in most instances an additional operator to handle the machine. The precut strip would then be turned to form an annulus and its ends joined by any suitable means, such as a pair of mating bevel gears.

There were no machines heretofore for forming dough annuli that did not require precut cylindrical strips of dough.

Accordingly, it is a general object of the present invention to provide an apparatus for forming an annulus that avoid all of the foregoing disadvantages of the other methods of and apparatus for making an annulus used heretofore.

A primary object is to provide an apparatus for forming dough into the shape of an annulus.

A more specific object is to provide an apparatus for forming an annulus that do not require a precut cylindrical strip of dough.

Another object is to provide an apparatus for forming an annulus of dough which is seamless, of uniform thickness and has not been excessively kneaded or worked to prevent rising during a subsequent baking operation.

A further object is to provide an apparatus for forming an annulus that are simple, efficient and inexpensive.

Still other objects reside in the durability and automatic operation of the apparatus.

Other objects and advantages of this invention will be readily apparent from the following description when considered in connection with the appended drawings.

In its broadest concept, the present invention embodies apparatus having an elongated forming rod supported so that its axis is in alignment with the axis of an annulus-forming sleeve adapted to have relative movement around the rod for forming a ball-like batch of dough received therebetween into a seamless annulus of uniform thickness. A precut cylindrical strip, as required in apparatus heretofore—need not be fed to the present apparatus but only a substantially imperforate ball-like batch of dough having no exact shape may be used.

Figure 3:
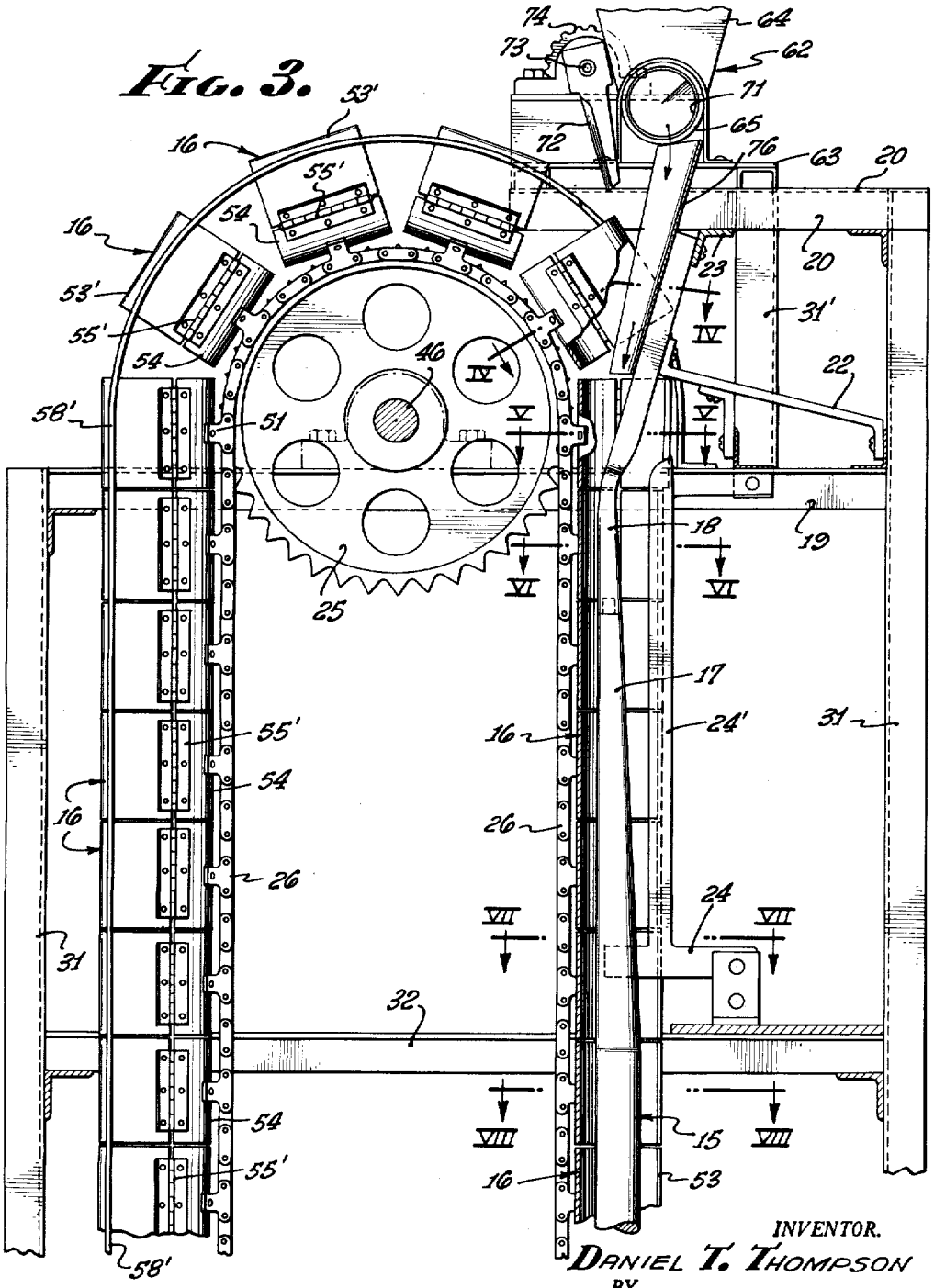
FIG. 3 is a longitudinal section of the apparatus taken along plane III—III of FIG. 2.

An exemplary device or apparatus is illustrated in the drawings, wherein an elongated forming rod 15 may be supported so that its axis is in alignment with the axes of a plurality of annulus-forming sleeves 16 adapted to be moved relatively to the rod so that the sleeves 16 and rod cooperate to grip roll, knead and form a substantially imperforate ball-like batch of dough received at the upper end of the rod into an annulus of dough at the lower end or discharging end of the rod. As best seen in FIG. 3, the rod 15 may be supported from its dough-receiving end 17 by means of an elongated support 18 connected to horizontal angle frame members 19 and 20 by supporting brackets 22 and 23, respectively. To further support rod 15, an additional supporting bracket 24 may be connected to rod 15 and carried by an angle frame member 32. When the bracket 24 is provided, a thin, elongated, upwardly extending extension 24' is connected to bracket 24, and rigidly carried on frame member 19. The extension 24' is used to prevent the moving sleeves 16 from engaging the bracket 24 as will be obvious from the following description. The dough-receiving end 17 of the rod 15 and the lower end of support 18 may be tapered as shown in FIG. 3 for reasons described hereinafter.

Means may be provided for moving the forming sleeves 16 and forming rod relative to each other, an exemplary means as shown may be an upper sprocket wheel 25, a lower sprocket wheel 25', and a continuous link chain 26 entrained around said wheels. The lower sprocket wheel 25' is keyed to a horizontal shaft 27 having its end journaled in suitable bearings 28 and 28' carried on a horizontal angle-supporting member 29. A plurality of vertical angle supports 31 may support and be rigidly secured to the horizontal angle-supporting members 29, 32, 19 and 20. The lower sprocket wheel 25' is the driven wheel and may be rotated by any suitable motor 33 carried on a horizontal supporting member 34 rigidly connected to a vertical supporting member 31. The motor 33 drives a reduction gear box 35, carried on a lower horizontal supporting member 36, through a sheave 37 secured to the motor shaft, a sheave 38 connected to the gear box 35 and a belt 39 entrained over the sheaves 37 and 38. A stub shaft 41 caries a sprocket wheel 42 and extends from the gear box 35 for driving a link chain 43 connected to a sprocket wheel 44 keyed to the shaft 27. It can thus be seen that the lower sprocket wheel 25' is driven by the motor 33 through the sheave 37, belt 39, sheave 38, gear box 35, sprocket wheel 42, link chain 43, sprocket wheel 44, and the shaft 27. The upper and driven sprocket wheel 25 is suitably keyed to a horizontal shaft 46 having its ends journaled in bearings 47 and 47' carried on the horizontal supporting member 19. The link chain 26 is thus adapted to be continuously driven around the sprocket wheels 25 and 25'.

Figure 4:
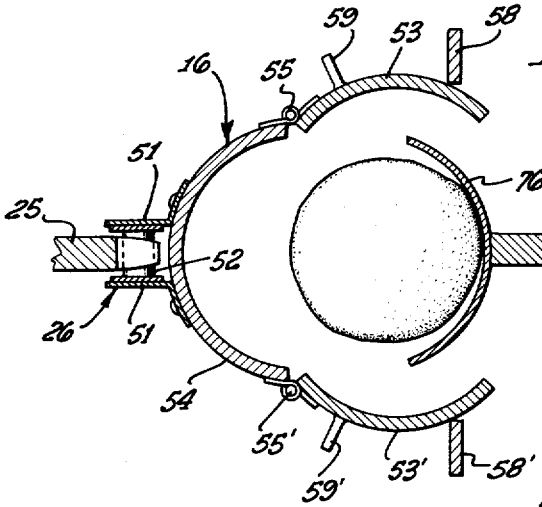
FIG. 4 to FIG. 8 are transverse sections through the forming rod and forming sleeves indicating how a ball-like batch of dough is formed into an annulus, where each section is respectively taken along planes IV—IV, V—V, VI—VI, VII—VII, and VIII—VIII of FIG. 3.

The forming sleeves 16 are adapted to be carried by the link chain 26 by any suitable means whereby the sleeves are adapted to form a substantially continuous elongated sleeve when the sleeves have their axes in alignment and coincide with the axis of the forming rod 15. The sleeves can vary in size and diameter dependent on the diameter of the finished annulus desired and also on the physical dimensions of the device, such as the radii of the sprocket wheels 25 and 25'. It has been found that each of the sleeves 16 may be suitably connected to and carried on the link chain 26 by a pair of spaced L-shaped supporting ears 51 (FIG. 4) connected on alternate links on the chain 26. One leg of each of the ears 51 may be riveted or otherwise connected to a rigid portion 54 of the sleeve 16 and the other legs of the ears 51 may be rigidly secured to a pin 52 usually provided in a link chain. As shown in FIG. 4, a sprocket of the sprocket wheel 25 is adapted to contact pin 52 and move the sleeve 16 in a continuous manner.

Figure 2:
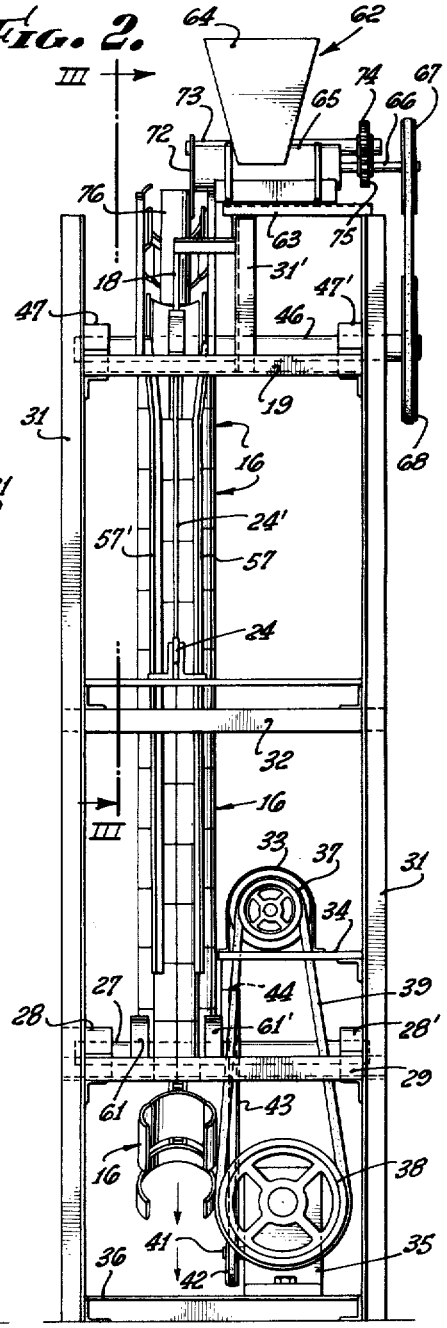
FIG. 2 is a rear elevation of the apparatus shown in FIG. 1.
Figure 8:
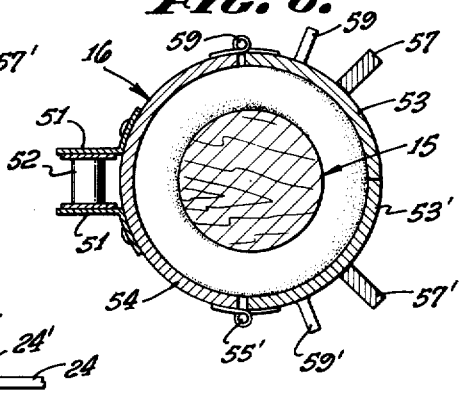

Each of the forming sleeves 16 may have pivotally connected annulus-forming and releasing portions 53 and 53' adapted to move radially with respect to rod 15. The pivoted portions 53 and 53' may be connected to the substantially semicircular rigid portion 54 of the sleeve 16 by suitable hinges 55 and 55', respectively, and are adapted to move into an annulus-forming position as shown in FIG. 8 and into an annulus-releasing position as best shown by the sleeves 16 in the lower portion of FIG. 2 traveling around the lower sprocket wheel 25'. Also seen in FIG. 2 are the pivoted portions 53 and 53' of the sleeves 16 in the open position as they move around the upper sprocket wheel 25 and begin their travel around the dough-receiving end 17 of the forming rod 15. Releasing tabs 59 and 59' may be provided on pivoted portions 53 and 53', respectively, for aiding in moving the portions into the annulus-releasing position.

Figure 5:
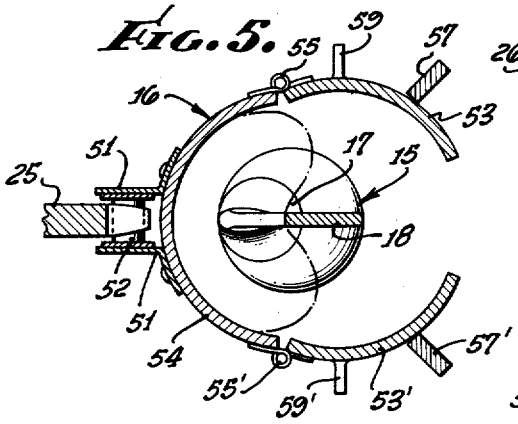

The pivoted portions 53 and 53' of each of the sleeves 16 are automatically closed by suitable means into the annulus-forming position and one exemplary means may be spaced, continuous, elongated cam tracks 57 and 57' positioned on either side of the sleeves 16 and radially spaced from the rod 15 a suitable distance to force the pivoted portions 53 and 53' inwardly to cooperate with the rod and to form an annulus at the discharging end of the forming rod 15. These elongated cams 57 and 57' may be carried by any well-known means (not shown) from the angle supports 19, 32 and 29 and have their upper ends adjacent the upper portion of rod end 17. FIG. 5 shows the cams 57 and 57' engaging and tending to urge the pivoted portions 53 and 53' towards the closed annulus-forming position. As the sleeves 16 start their downward movement over the dough-receiving end 17 of the rod 15, cams 57 and 57' urge the pivoted portions 53 and 53' into a fully closed position (FIG. 6) so that the ends thereof are in contact with the thin, elongated extension 24'. After the sleeves have passed below the support 24, the cams 57 and 57' again are radially closer to the rod 15 and thus fully force the pivoted portions 53 and 53' into mating position (FIG. 8) for forming the ball of dough into the shape of an annulus. It is readily understood that the inner diameter of the sleeve 16 in the annulus-forming position (FIG. 8) is substantially the same as the outer diameter of the finished annulus and the diameter of the rod 15 is substantially the same as the inner diameter of the finished annulus as best seen in FIG. 8.

The elongated continuously curved cams 57 and 57' thus act as means for closing the pivoted portions 53 and 53' of the sleeves 16 and also as guide means for maintaining the pivoted portions 53 and 53' in the annulus-forming position during relative movement between the forming sleeves 16 and the forming rod 15. Spaced continuous guides 58 and 58' may be provided around and spaced from the chain 26 for maintaining the pivoted portions 53 and 53' in the open position until they again reach the rod-receiving end 17.

Figure 1:
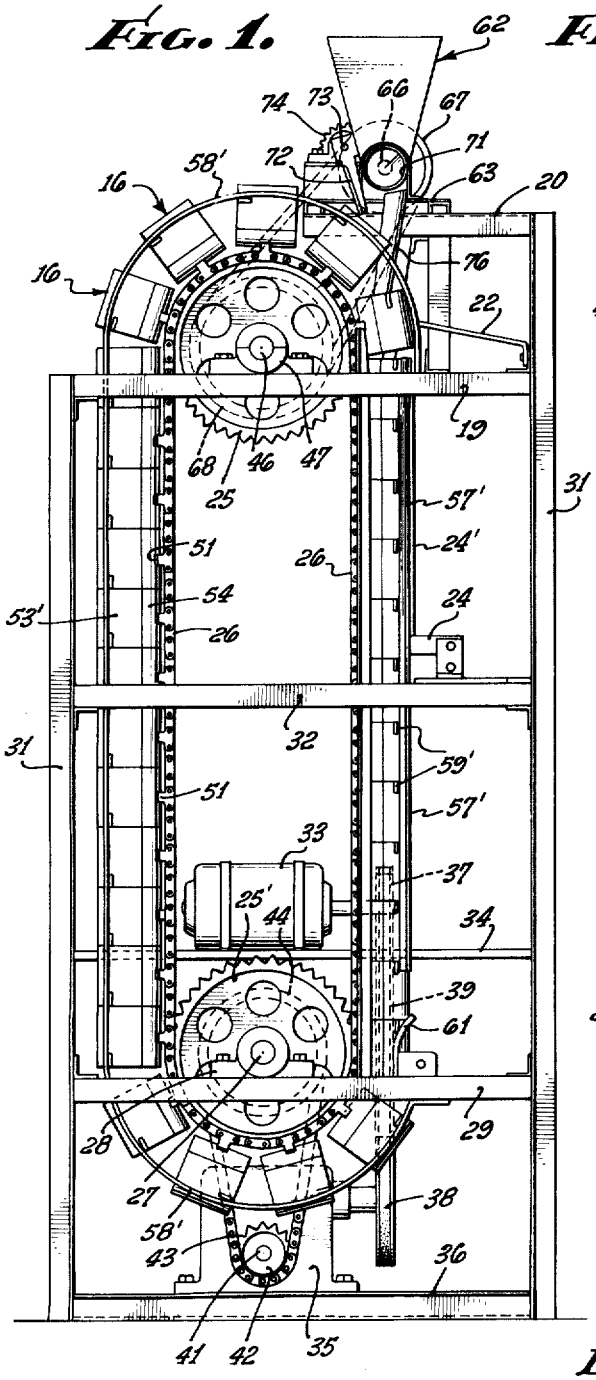
FIG. 1 is a side elevational view of an exemplary apparatus of the present invention.

Adjacent the discharging end or the lower end of the rod 15, releasing means may be provided for opening the pivoted portions 53 and 53' of the sleeves 16 to release the annulus of dough from the forming rod. As shown in FIGS. 1 and 2, a pair of spaced stationary cam-releasing means 61 and 61' may be carried by the horizontal supporting member 29 for engaging the releasing tabs 59 and 59' of pivoted portions 53 and 53' and urging them outwardly thus releasing the annulus of dough being carried within the sleeves. The releasing means 61 and 61' may be spring-biased or otherwise constructed so that they are always returned to a position for engaging the releasing tabs 59 and 59' and forcing the pivoted portions into the annulus-releasing position.

Dough-feeding means 62 may be provided for feeding a ball-like batch of dough to the receiving end 17 of the rod when the sleeves 16 are substantially adjacent the receiving end of the rod. As shown, the dough-feeding means may be supported on a horizontal shelf 63 rigidly carried by the vertical angle supports 31 and 31'. A loading hopper 64 may be provided on a housing 65 carrying a screw feed driven by a horizontal shaft 66. The screw feed and shaft 66 may be driven in timed relation to the movement of the sleeves 16 around the receiving end 17 of the rod 15. Such driving means may include a sheave 67 carried on the end of the shaft 66, a sheave 68 carried on one end of the shaft 46, and a belt entrained over the sheaves 67 and 68. As the sprocket wheel 25 and shaft 46 are driven by means of the motor 33, it can easily be understood that the screw feed carried by the shaft 66 will also be continuously driven. As the dough is forced out of an opening 71 in the dough-feeding means 62, a rotating knife 72 is adapted to sever the dough and allow a ball-like batch of dough to fall and be fed to the receiving end 17 of the rod 15. The knife 72 is keyed to one end of a horizontal shaft 73 having a gear 74 mounted on its other end and in mesh with a pinion gear 75 carried on the shaft 66. As the shaft 66 and screw feed are rotated, the knife 72 will also be rotated into cutting position with the feeding dough by means of the shaft 73 and gears 74 and 75. It is understood that the knife 72 can be rotated at different speeds depending upon the amount of dough required to be fed to the receiving end 17 of the rod 15. A dough-guide chute 76 may be provided immediately below the opening 71 in the dough-feeding means and extends downwardly and may be supported by the support 18 for guiding the ball-like batch of dough toward the receiving end 17 of the rod.

In the operation of the apparatus, the dough received from the dough-feeding means 62 slides down the guide chute 76 and is wedged between the inner surface of the rigid portion 54 of a sleeve 16 and the upper end 17 or the support 18 for the upper end 17 of the rod as best seen in FIG. 5. The inner surface of the rigid portion 54 of each of the sleeves 16 applies radial pressure to the dough and squeeges, compresses and forces it in contact with the elongated forming rod 15. It is understood that the volume of dough fed to the rod 15 should be such that the sleeve 16 can cooperate with the rod to grasp and move the dough around and along the rod and to form the dough into an annulus by rotation of the dough about the circular center line of such annulus.

As each of the sleeves 16 moves downwardly along the rod 15, the dough is uniformly grasped, spread and moved along and around the rod by means on the sleeves 16, namely, the inner surfaces of the sleeves 16, causing the ends of the dough to meet and to be joined in integral relation.

Figure 6:
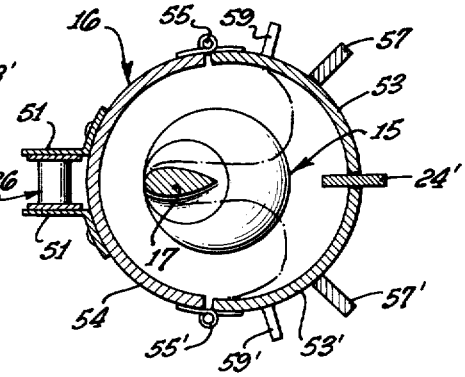
Figure 7:
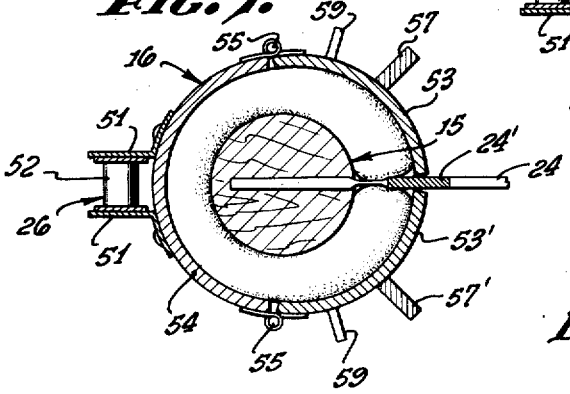

The step-by-step process can be seen in FIGS. 4 through 8 wherein FIG. 4 shows a batch of dough immediately after leaving the feeder 62 and on the chute 76. In FIG. 5, the dough is wedged between a sleeve 16 and the rod end 17 and the pivoted portions 53 and 53' have started to close. FIG. 6 shows the pivoted portions 53 and 53' in the closed annulus-forming position and the dough starting to extend around the receiving end 17 of the rod 15. In FIG. 7, the dough has been forced around the rod and into the shape of an annulus and is about to pass around the support 24. Immediately after the dough moves beyond the support 24, the ends of the dough are forced together and are joined in an integral relationship to form an annulus as shown. Generally, the dough has already been shaped into an annulus before reaching the support 24 and is then severed by support 24. As shown in FIG. 7, the support 24 may be very thin to provide a thin severing line in the dough, the ends of which are immediately rejoined in an integral manner after leaving support 24. As the sleeves move around the lower sprocket wheel 25', the releasing tabs 59 and 59' engage the cam-releasing means 61 and 61', respectively, causing the sleeves to open and release the annulus of dough. A table or moving conveyor may be provided adjacent the lower end of the apparatus for receiving the finished annuli of dough if it is desired.

As shown in FIG. 3, it has been found that the upper receiving end 17 of the rod 15 may be tapered so that there is a greater space or cavity between the rod and the pivoted portions 53 and 53' of each of the sleeves 16. It has been found that there is a greater tendency for the dough to be quickly forced around the rod and to flow into this large cavity. It can be understood that the ball-like batch of dough received at the upper end of the rod 15 is continuously forced downwardly and around the rod as the sleeves 16 are continuously rotated. Each batch of dough may not be carried downwardly around the rod by a single sleeve 16. In practice, it has been found that sometimes a batch of dough may require more than one sleeve to shape it into an annulus at the discharging end of the rod. However, since the sleeves 16 are closely spaced to each other, a substantially continuous inner circumferential wall is provided thus allowing a batch of dough to move from one sleeve to the other during a forming operation. When the dough begins to form into an annulus, the dough is forced to revolve about the circular center line of the annulus thus kneading and rolling the dough and causing the ends thereof to mesh and be integrally associated to form a seamless annulus of uniform thickness. This operation is completely automatic and requires little maintenance.

Figure 9:
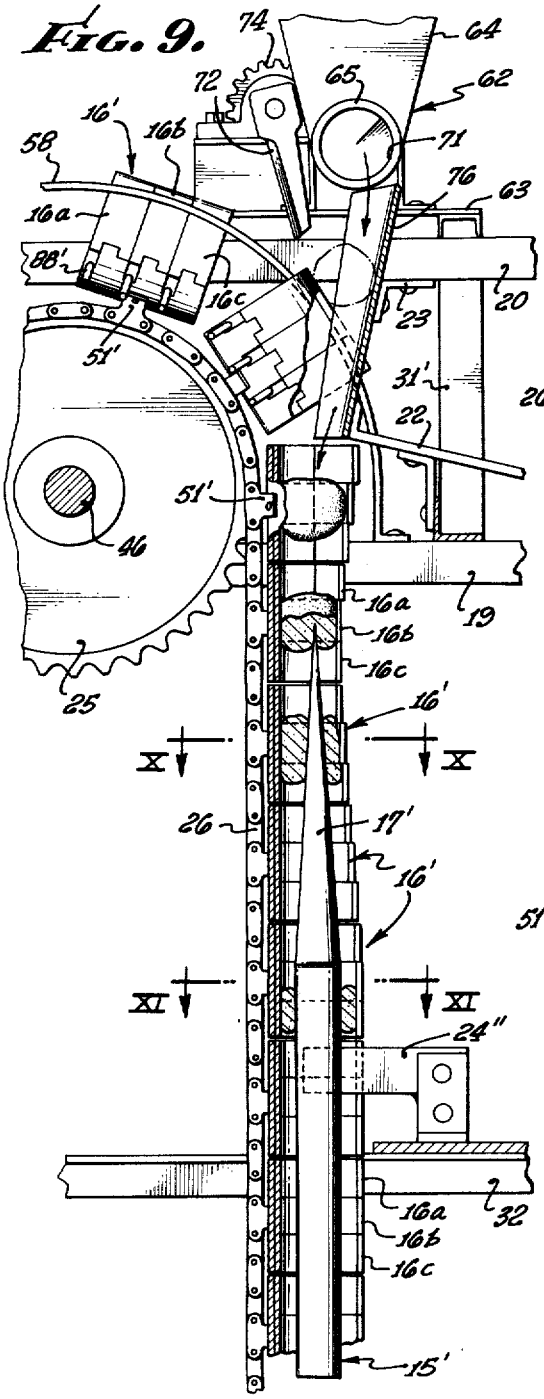
FIG. 9 is an enlarged, fragmentary side elevation, partly in section, of another embodiment of the exemplary apparatus of the present invention.
Figure 10:
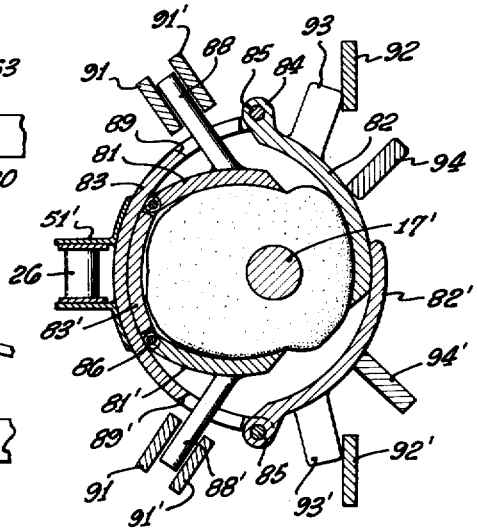
FIGS. 10 and 11 are transverse sections taken along planes X—X and XI—XI, respectively, of FIG. 9.
Figure 11:
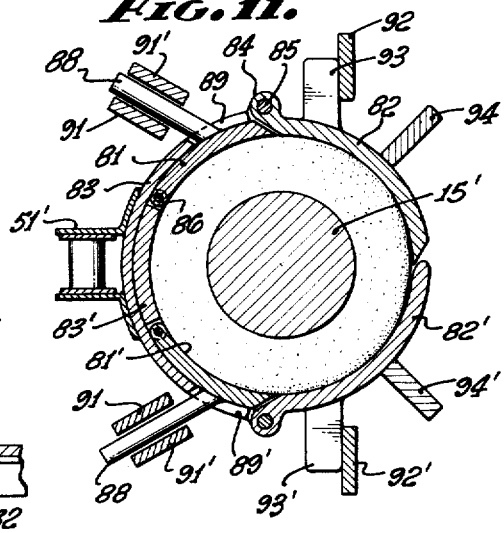

FIGS. 9, 10 and 11, show a slightly different embodiment of the invention for obtaining an annulus of dough which is substantially seamless and requires relatively little rolling and kneading during its forming operation thus insuring that the annulus of dough will rise during the baking operation. The upper end 17' of a forming rod 15' may be tapered and may terminate into a relatively sharp point. The rod 15' may be supported by a bracket 24'' carried by the horizontal framing member 32. Sprocket wheel 25 is adapted to be driven by the link chain 26 which carries a plurality of sleeves 16' similar in function to the sleeves 16 described above. The dough-feeding means 62 may also be used for providing a ball-like batch of dough on the upper end 17' of the rod 15'. As shown in FIG. 9, the ball-like batch of dough is fed from the feeder 62 and is adapted to be impaled on the pointed end 17' of the rod.

Each of the sleeves 16' comprises a plurality of longitudinal sections 16a, 16b, and 16c, wherein each section includes inner radially movable, pivotally connected dough-gripping portions 81 and 81' and outer pivotally connected annulus-forming and releasing portions 82 and 82'. The inner and outer portions 81 and 82 of each section are adapted to move radially into an annulus-forming position where all of the portions form a substantially continuous inner cylindrical wall for contacting the dough (FIG. 11) and into a dough-gripping position (FIG. 10) conforming to the diameter of the rod and depending upon the amount of dough therebetween. Each longitudinal section of a sleeve 16' has a rigid portion 83 rigidly connected to each other, wherein the portion 83 of section 16b is connected to a link in the chain 26 by means of spaced L-shaped connecting ears 51'. The outer portions 82 and 82' may be provided with eyelets 84 for being pivotally connected to complementary eyelets on the rigid portion 83 of each section of the sleeve 16' and a suitable pin 85 may be positioned between the eyelets for providing pivotal movement of the outer portions 82 and 82'. The inner portions 81 and 81' are pivoted by well-known eyelet and pin means 86 to an inner rigid portion 83' rigidly secured to the outer rigid portion 83 of each section. Radial extending rods 88 and 88' may be rigidly provided on the inner portions 81 and 81', respectively, and suitable openings 89 and 89' may be provided in the rigid portion 83 of each section for receiving and allowing the rods 88 and 88', respectively, too move radially.

The rods 88 and 88' are received in and form part of the means for closing the inner gripping portions 81 and 81' for engaging the impaled dough on the receiving end 17' of the rod and for allowing the gripping portions 81 and 81' to move into the annulus-forming position shown in FIG. 11. This means may comprise spaced, elongated curved cam tracks 91 and 91' suitably arranged adjacent the length of the forming rod 15' to move the rods 88 and 88' and pivoted inner portions 81 and 81' inwardly to grip the dough at the pointed receiving end 17' of the rod. As the sleeves move downwardly, the cam tracks 91 and 91' are radially spaced from rod 15' and so arranged as to allow the inner gripping portions 81 and 81' to move radially outwardly until they are in the annulus-forming position shown in FIG. 11.

Suitable elongated camming means may also be provided for closing the outer portions 82 and 82' to engage the dough in the annulus-forming position and may include similar elongated curved cam tracks 92 and 92' adapted to engage radial tabs 93 and 93', respectively, rigidly secured on the pivoted outer portions 82 and 82'. As seen in FIGS. 10 and 11, additional elongated cam tracks 94 and 94' may be provided for insuring that the outer portions 82 and 82' are forced into engagement with the dough when impaled on the pointed end 17' of the rod. For this purpose, one track 94 may be positioned slightly inwardly from the other track 94', thus causing the outer portions 82 and 82' to be overlapped as shown in FIG. 10 to aid in gripping the dough impaled on the pointed end of the rod. It should be noted, the outer portions 82 and 82' are offset and are positioned slightly inwardly from the rigid portion 83 of each of the sections so that a smooth continuous cylindrical inner wall is provided when the inner portions 81 and 81', and the outer portions 82 and 82' are in the annulus-forming position shown in FIG. 11.

It can thus be seen in the operation of the embodiment shown in FIGS. 9, 10 and 10, that the dough received from the feeding means 62 is impaled on the pointed end of the rod 17' and is adapted to be engaged and pulled downwardly by the sections 16a, 16b, and 16c of each of the sleeves 16' as they are moved downwardly relative to the rod 15'. Each section of each sleeve 16' is adapted to have its inner portions 81 and outer portions 82 separately movable so that as shown in FIG. 9, each section may be at a different radial distance from the tapered end 17' of the rod after the impaled dough is engaged and moved downwardly along with the sleeve 16'. The cams 91, 92 and 94 are so constructed and arranged, that the inner portions 81 and outer portions 82 form a continuous inner cylindrical wall of uniform diameter when surrounding the rod 15' below its receiving end 17'.

When a batch of dough is impaled on a pointed rod, it is seen that an annulus of dough can easily be formed which is seamless and does not require the joining and integral forming of the loose ends of a batch of dough. However, as shown in FIG. 9, due to the necessity of supporting the rod 15', the support 24'' severs the dough as it is moved downwardly but the severed ends of the dough are immediately rejoined due to the rolling and kneading thereof by means of the sleeves 16 and the rod 15'. It is suggested that a relatively thin support 24'' be provided for severing the dough.

The apparatus of the present invention provides a method of forming a ball-like batch of dough into an annulus comprising the steps of applying radial pressure to a ball-like batch of dough, forcing it into contact with one end of an elongated rod, and rolling and kneading the dough from one end of the rod toward the other end of the rod to uniformly spread the dough around the rod and form a seamless annulus of dough of uniform thickness.

[According] *Accordingly,* there is provided an apparatus for forming dough into the shape of an annulus that is efficient and positive in operation to deliver a continuous flow of annuli. The operation of the device is continuous, positive and foolproof and is needed in the trade, as annuli formed from certain dough, such as that used in the production of bagels has of necessity heretofore been accomplished manually.

Obviously, many modifications and variations of the present invention are possible in the light of the above teachings. For example, it may be required to provide circumferential, longitudinally spaced grooves on the forming rod to aid in forming the annuli. The length of the forming rod may vary dependent upon how quickly an annulus is formed and the amount of kneading of the dough that is permissible to still allow the dough to rise. It has been found that the embodiment shown in FIGS. 9 to 11 requires a shorter rod than the apparatus in FIGS. 1 to 8 for this purpose. It is therefore to be understood that within the scope of the appended claims, the invention may be practiced otherwise than as specifically described.

I claim:

1. An apparatus for forming a ball-like batch of dough into an annulus which is seamless and of uniform thickness, comprising: an elongated forming rod having a tapered dough-receiving end for impaling the batch of dough and an annulus-discharging end and being supported so that its axis is in alignment with the axis of an annulus-forming sleeve; and means for moving said forming sleeve and forming rod relative to each other so that said sleeve and rod cooperate to roll, knead and form a ball-like batch of dough received at the receiving end of said rod into an annulus of dough at the discharging end of said rod, said sleeve having inner, radially movable, pivotally connected dough-gripping portions and outer pivotally connected annulus-forming and releasing portions.

2. An apparatus as stated in claim 1 wherein said inner gripping portions are adapted to close and to grip the impaled dough on the receiving end of the rod and to force the dough towards the discharging end of the rod, said inner and outer portions being adapted to move radially into an annulus-forming position where all of the portions form a substantially continuous inner cylindrical wall for contacting the dough; means for closing said gripping portions for engaging the impaled dough on the receiving end of the rod and for allowing said gripping portions to move into the annulus-forming position; means for closing said outer portions to engage said dough in the annulus-forming position; and releasing means for opening said outer portions of said sleeve to release the annulus of dough from the forming rod.

3. An apparatus for forming a ball-like batch of dough into an annulus which is seamless and of uniform thickness, comprising: an elongated forming rod having a tapered dough-receiving end for impaling the batch of dough and an annulus-discharging end and being supported so that its axis is in alignment with the axis of an annulus-forming sleeve; and means for moving said forming sleeve and forming rod relative to each other so that said sleeve and rod cooperate to roll, knead and form a ball-like batch of dough received at the receiving end of said rod into an annulus of dough at the discharging end of said rod, said sleeve comprising a plurality of longitudinal sections wherein each section includes inner radially movable pivotally connected dough-gripping portions and outer pivotally connected annulus-forming and releasing portions, the inner and outer portions of each section being adapted to move radially into an annulus-forming position where all of said portions form a substantially continuous inner cylindrical wall for contacting the dough and into a dough-gripping position conforming to the diameter of the rod and depending upon the amount of dough therebetween.

4. An apparatus as stated in claim 3 including means for closing said gripping portions for engaging the impaled dough on the receiving end of the rod and for allowing said gripping portions to move into the annulus-forming position; means for closing said outer portions to engage said dough in the annulus-forming position; and releasing means for opening said outer portions of said sleeve to release the annulus of dough from the forming rod.

5. An apparatus for forming a substantially imperforate, ball-like batch of dough into an annulus comprising:

an elongated forming rod having a tapered, dough-receiving end and annulus-discharging end;

a sleeve having its axis in alignment with the axis of said rod;

means for supplying a substantially imperforate ball-like batch of dough into contact with the said tapered end of said rod; and means for moving said sleeve and rod relative to each other so that said sleeve extends around and encompasses said rod and dough during relative movement of the rod and sleeve from a position where the sleeve is around said tapered end to a position where the sleeve is around the discharge end, said sleeve including means for grasping and moving said dough around and along said rod to form said dough into an annulus by rotation of the dough about the circular center line of such annulus.

6. An apparatus as stated in claim 5, wherein said tapered dough-receiving end of said rod terminates into a relatively sharp point for impaling the ball-like batch of dough.

7. An apparatus as stated in claim 5, wherein the inner diameter of said sleeve is substantially the same as the outer diameter of the finished annulus and the diameter of said rod is substantially the same as the inner diameter of said finished annulus.

8. An apparatus for forming a substantially imperforate ball-like batch of dough into an annulus comprising:

an elongated forming rod having a tapered, dough-receiving end and an annulus-discharging end;

a sleeve having its axis in alignment with the axis of said rod and having pivotally connected annulus-forming and releasing portions that are adapted to meet and to form cylindrical portions of the sleeve in an annulus-forming position and to be spaced in an annulus-releasing position;

means for supplying a substantially imperforate ball-like batch of dough into contact with the said tapered end of said rod; and means for moving said sleeve and rod relative to each other so that said sleeve extends around and encompasses said rod and dough during relative movement of the rod and sleeve from a position where the sleeve is around said tapered end to a position where the sleeve is around the discharge end, said sleeve including means for grasping and moving said dough around and along said rod to form said dough into an annulus by rotation of the dough about the circular center line of such annulus.

9. An apparatus as stated in claim 8 including:

means for closing said pivoted portions of said sleeve into the annulus-forming position as the sleeve encloses the tapered end of said rod for contacting and compressing the ball-like batch of dough around said rod and towards said discharging end of said rod;

guide means for maintaining said pivoted portions of said sleeve in the annulus-forming position during relative movement between said sleeve and rod; and releasing means for opening said pivoted portions of said sleeve to release the annulus of dough from the rod.

10. An apparatus as stated in claim 8, wherein the inner diameter of said sleeve is substantially the same as the outer diameter of the finished annulus and the diameter of said rod is substantially the same as the inner diameter of said finished annulus.

11. An apparatus as stated in claim 9, wherein said tapered end of said rod terminates into a relatively sharp point for impaling the batch of dough.

*12. An apparatus for forming a substantially imperforate, ball-like batch of dough into an annulus, comprising:*

*an elongated forming rod having a tapered dough-receiving end;*

*sleeve means having its axis in alignment with the axis of said rod;*

*means for supplying a substantially imperforate, ball-like batch of dough into contact with said tapered end of said rod; and*

*means for moving said sleeve means and rod relative to each other so that the sleeve means extends substantially around and encompasses said rod and dough during relative movement of the rod and sleeve means, said sleeve means including means for moving said dough around and along said rod to form said dough into an annulus by rotation of the dough about the circular center line of such annulus.*

*13. An apparatus as stated in claim 12, wherein said tapered dough-receiving end of said rod terminates into an impaling point for impaling the ball-like batch of dough.*

References Cited in the file of this patent or the original patent

UNITED STATES PATENTS

| | | |
|---|---|---|
| 829,097 | Crabb | Aug. 21, 1906 |
| 1,105,647 | Greaves | Aug. 4, 1914 |
| 1,552,430 | Gendler | Sept. 8, 1925 |
| 1,679,660 | Haskell | Aug. 7, 1928 |
| 1,755,921 | Gendler | Apr. 22, 1930 |
| 1,871,837 | Brown | Aug. 16, 1932 |
| 1,940,564 | Schilling | Dec. 19, 1933 |
| 2,263,490 | Fox | Nov. 18, 1941 |
| 2,584,514 | Thompson et al. | Feb. 5, 1952 |
| 2,591,546 | Hettinger | Apr. 1, 1952 |
| 2,611,329 | Lehman | Sept. 23, 1952 |
| 2,613,619 | Willomitzer | Oct. 14, 1952 |
| 2,625,119 | Jennings | Jan. 13, 1953 |
| 2,628,578 | Roth | Feb. 17, 1953 |
| 2,666,398 | Gendler et al. | Jan. 19, 1954 |
| 2,779,298 | Chwirut et al. | Jan. 29, 1957 |

FOREIGN PATENTS

| | | |
|---|---|---|
| 285,188 | Great Britain | Feb. 16, 1928 |